Feb. 27, 1923. 1,446,662
G. SAMUEL
DRILLING TOOL
Filed Dec. 2, 1920   3 sheets-sheet 1
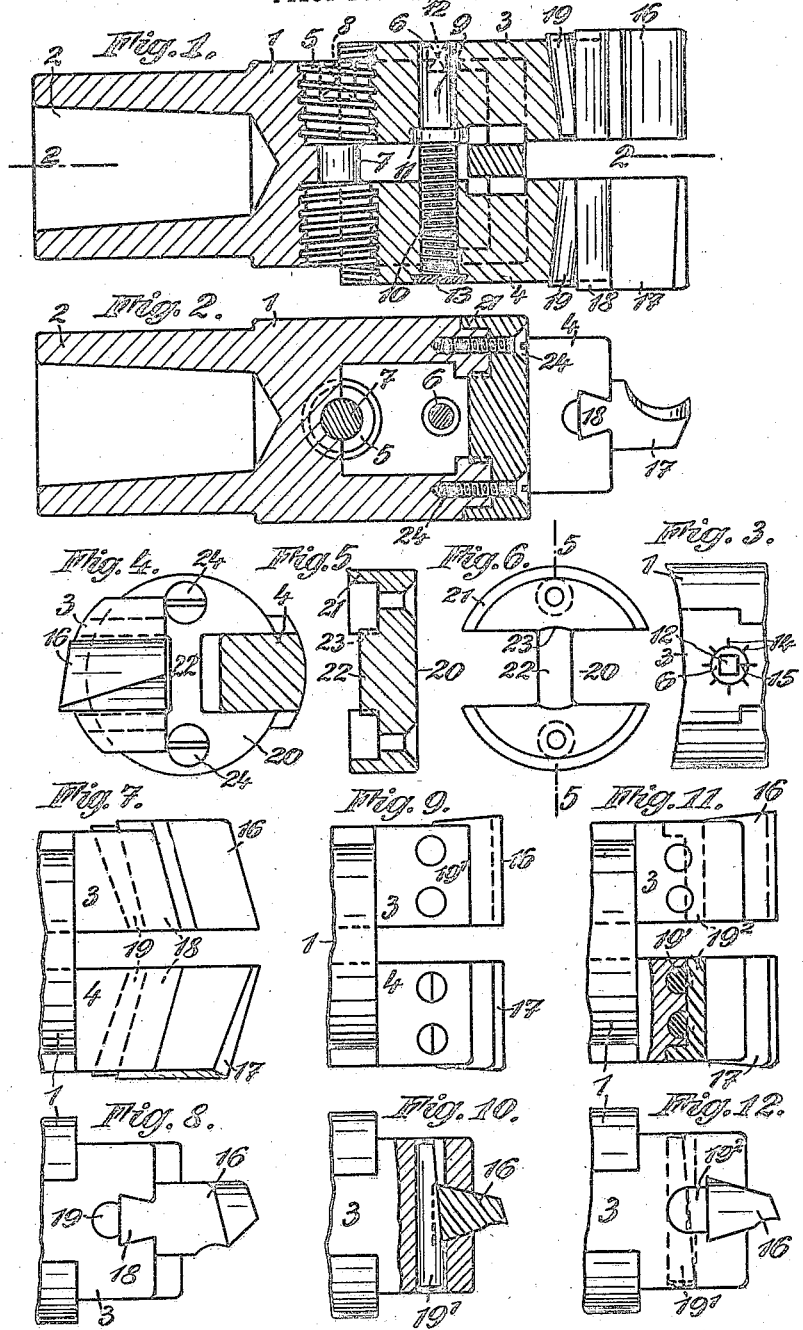
Inventor.
Georg Samuel
By Lawrence Langner
Attorney.

Feb. 27, 1923.  1,446,662
G. SAMUEL
DRILLING TOOL
Filed Dec. 2, 1920  3 sheets-sheet 2
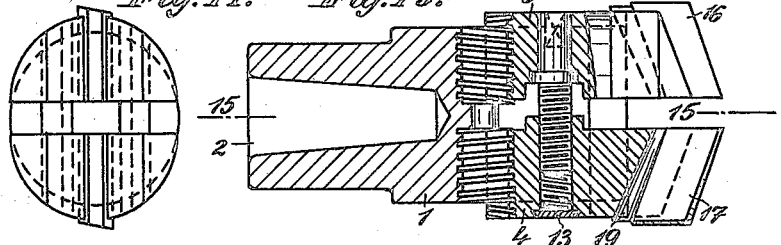
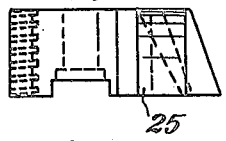
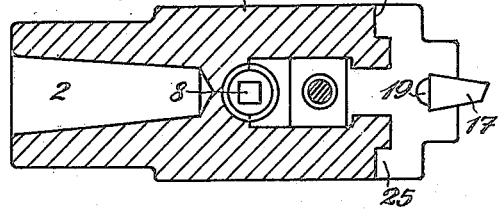
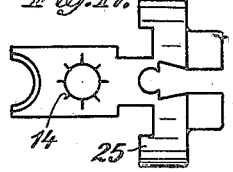
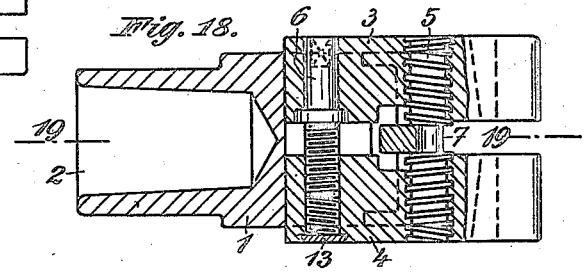
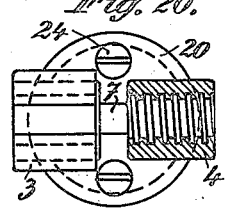
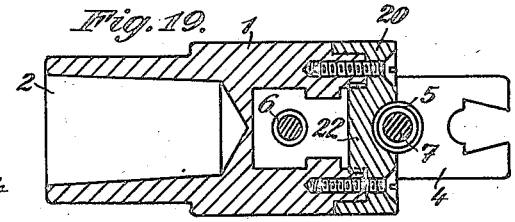
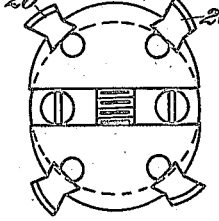
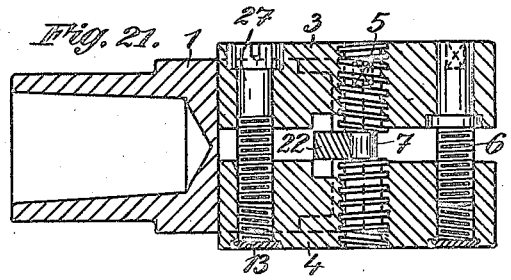
Inventor.
Georg Samuel
By Lawrence Langner
Attorney.

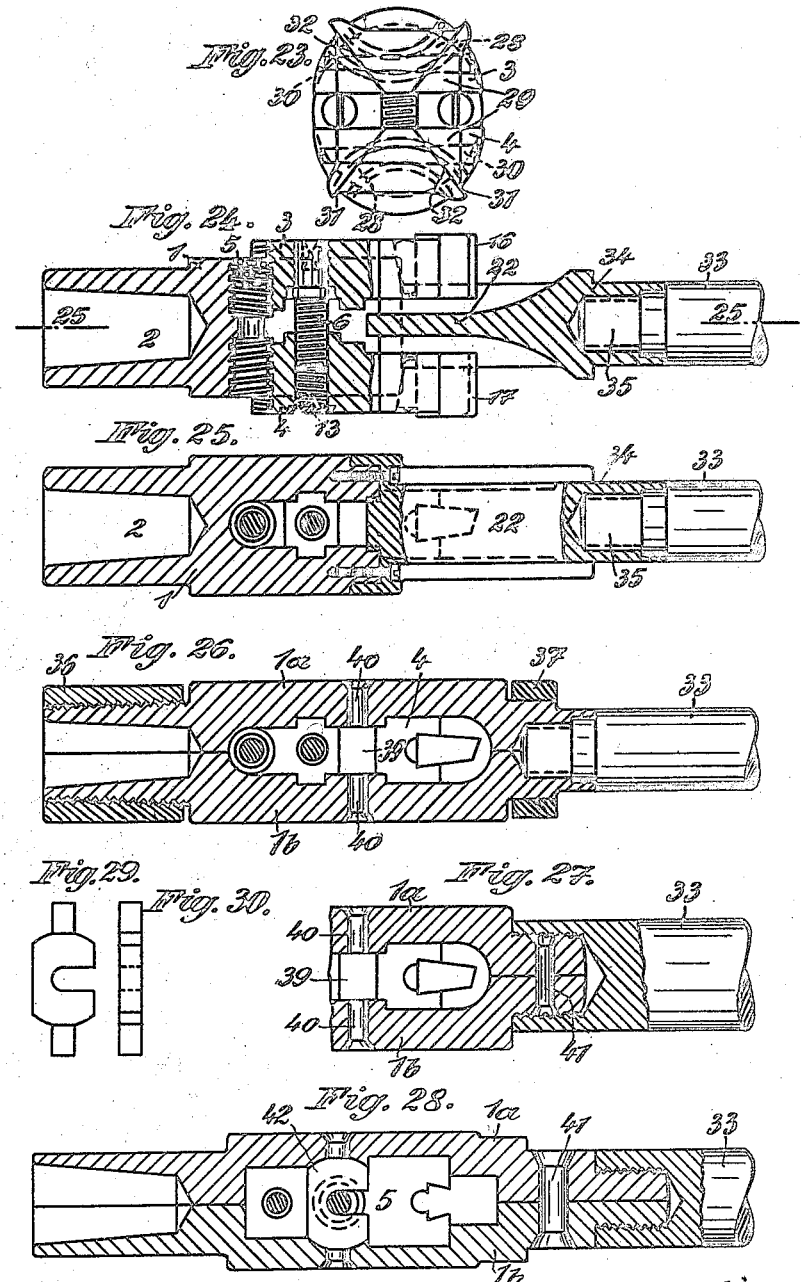

Patented Feb. 27, 1923.

1,446,662

UNITED STATES PATENT OFFICE.

GEORG SAMUEL, OF BERLIN, GERMANY.

DRILLING TOOL.

Application filed December 2, 1920. Serial No. 427,853.

*To all whom it may concern:*

Be it known that I, GEORG SAMUEL, residing at Plan Ufer 92b, Berlin, Germany, have invented certain new and useful Improvements in Drilling Tools (for which I have filed an application in Germany Dec. 16, 1919, No. 51,790; May 12, 1920, No. 53,051; June 28, 1919, No. 36,056; and February 26, 1920, No. 52,373), of which the following is a specification.

This invention relates to adjustable drilling tools in the broadest sense of the term, or in other words, to drilling heads, adjustable reamers, taps and the like in which the blades are mounted on movable cheeks or blocks which are arranged to be diametrically adjusted and locked in their adjusted positions by at least two screw-like members adapted to tighten up the blade blocks against each other and which, on account of their interrelation, render it possible to regulate accurately the adjustment of the diameter according to the adjustment of one of the screws.

The invention further relates to drilling tools of the aforesaid kind but having the two screws arranged in a plane passing through or arranged parallel with the axis of the tool, as distinguished from other tools in which tensioning screws are also used but are positioned in different planes. The strength of the new tool is therefore considerably less impaired than that of the known implements having diametrically adjustable blade carrying blocks, they can be of a more compact construction and are capable of taking up torsional stresses without causing vibration of the cheeks or blocks and without an undue alteration in the tool diameter being able take place.

Further objects of the invention are drilling tools of the aforesaid kind in which the tool body is stiffened by suitable means against pressure or stress acting in an inward or outward direction, and in which the said stiffening means are used to support one of the adjusting and tightening screws.

Further objects of the invention are drilling tools of the aforesaid kind in which the blade blocks are tightened against each other by means of three screws, and drilling tools in which the proper tools or blades are secured upon the blade blocks by means of a peculiar arrangement of keys and undercut grooves permitting a compact construction without endangering the stability of the implement and without complicating the easy relative adjustability of the blocks, or of the blades upon the blocks respectively.

All these and other features of the invention are hereafter described in connection with the drawings illustrating the preferred embodiments of the invention and in which:

Fig. 1 is a vertical section through the centre of one embodiment of the new drilling tool.

Fig. 2 is a section on the line 2—2 of Fig. 1.

Fig. 3 is a plan view of the upper end of one of the adjusting screws.

Fig. 4 is a front elevation according to Figs. 1 and 2; one of the cheeks or blocks being shown in section.

Fig. 5 shows a section through the stiffening cap on line 5—5 of Fig. 6.

Fig. 6 illustrates in front elevation the stiffening cap looking from the left of Fig. 4.

Figs. 7 and 8 are side elevation and plan view respectively of that end of the two blocks which carries the blades and in which the blades are fixed by means of a key piece extending substantially in the direction of the cutting edges.

Figs. 9 and 10 are side and plan view respectively of a modified form of arrangement for securing the blades, in which two key pieces extend substantially normal to the cutting edges.

Figs. 11 and 12 are side elevation and plan view respectively of a further modification, corresponding substantially to the modification of Figs. 9 and 10, but in which an intermediate member is interposed between the blades and the keys.

Fig. 13 is a central section of a further modification and in which the tool body is stiffened against radial pressure by the interengagement of the respective outer faces of the tool body and of the blade blocks sliding upon one another.

Fig. 14 is a front elevation, looking from the right hand side of Fig. 13.

Fig. 15 is a section on line 15—15 of Fig. 13.

Figs. 16 and 17 are side elevation and plan view respectively of one of the adjustable blade carrying blocks used in connection with this form of construction.

Fig. 18 is a central section of a further modification in which one of the adjusting screws is carried by the stiffening cap.

Fig. 19 is a section on line 19—19 of Fig. 18.

Fig. 20 shows a front elevation of this embodiment looking from the right hand side of Fig. 19, one of the blocks being in section.

Fig. 21 is a central section through still another modification in which the blocks are acted upon by three screws and are provided with blades having cutting edges substantially parallel with the axis of the tool, thus enabling the tool to be used as a tap.

Fig. 22 is a front elevation looking from the right hand side of Fig. 21.

Fig. 23 is the front elevation of a still further embodiment in which, however, the blades are held by means of circular grooves on the front of the blocks.

Fig. 24 is a central section through a still further modification which is especially adapted for use as a boring bar.

Fig. 25 is a section on the line 25—25 of Fig. 24.

Fig. 26 is a central section of still another modification, the tool body in this case consisting of two halves which are held together partly by external rings and partly by the stiffening member.

Fig. 27 the central section of a similar construction in which the parts of the tool body are in addition held together by rivets.

Fig. 28 is a similar section, in which one of the adjusting screws is carried by the stiffening member.

Figs. 29 and 30 are plan view and side elevation respectively of the stiffening member shown in Fig. 28 prior to its being riveted.

Figs. 1 to 6 of the drawing illustrate one way of constructing a drilling tool in accordance with the invention. In these figures, 1 designates the body of the tool which constitutes a guide for the two cheeks or blocks 3 and 4 at the end remote from the end of the tool body having the tapered socket 2. The two blocks are supported by the walls of the guide against endwise and lateral displacement. They are acted upon by two screws 5 and 6 whereby they can be diametrically adjusted and locked in any adjusted position. Adjustment of the blocks moves them to and from each other, whereby their distance apart and the diameter of the hole drilled by the implement may be varied at will and within a great range.

The screw 5 is provided at its ends with right and left hand threads adapted to engage correspondingly threaded grooves of the blocks 3 and 4. A portion 7 of reduced diameter between the two threaded ends rests in a semi-cylindrical recess of the tool body 1. The screw 5 is therefore only capable of a rotary movement, and cannot be moved axially, thus causing the blocks 3 and 4 to slide in the guide of the tool body relative to each other. Rotation of the screw 5 may be effected by means of a wrench, for the application of which a square hole 8 is provided in its upper end.

The screw 6, the unthreaded portion 9 of which is supported in the block 3, whilst its threaded end 10 engages with the block 4 is designed to cooperate with the screw 5 after the displacement of the blocks 3 and 4 to hold the blocks in proper position. A collar 11 provided between the portions 9 and 10, occupies a recess of the block 3 and a square hole 12 is provided for the application of a tool for operating the screw 6. The threads of the block 4 are protected by a small disk 13, against the entrance of chips and the like.

When both blocks are to be adjusted so as to modify, for example increase, the diameter of the drill, the screw 5 is turned so that the blocks 3 and 4 move outwardly in their guide. The screw 6 at first remains stationary, that is to say, it moves together with the block 4, its unthreaded shaft 9 sliding freely in the block 3. When the cheeks have been sufficiently separated by the screw 5, the screw 6 is screwed back until the collar 11 bears against the block 3, whereupon it is firmly tightened, so that the pressure forces the threads of the cheeks 3 and 4 on the one hand and of the screw on the other hand outwardly, upon each other thereby taking up any backlash which might exist. The action of both screws 5 and 6 is thus a counteraction, such as the action of a nut and a lock nut that is to say the screws lock or "counter" each other by the mutual repression of any back-lash and support the blocks 3 and 4 against any diametrical vibrations. In this way an exceedingly reliable relative and efficient mutual support of the two cheeks 3 and 4 is produced. This method of tightening the blade blocks against each other by means of at least two parallel screws arranged in a plane or planes passing through or parallel with the axis of rotation of the implement constitutes a principal difference from that kind of chuck tools in which the backlash is taken up by the said chuck jaws being pressed upon the tool which is to be held between them.

When the distance between the two blocks 3 and 4 is to be reduced, the screw 6 is first screwed back into the block 4 for a distance corresponding to the desired approach of the two blocks, whereupon they are both moved the one towards the other by a corresponding rotation of the screw 5, until the collar 11 bears again against the block 3 so that on further tensioning the screw 5 the mutual interlocking or countering of the blocks 3 and 4 again takes place. It can thus be seen, that there exists an interrelation between the screws 5 and 6 on the one side and the blocks 3 and 4 on the other side, inasmuch as one of the screws always determines the amount by which the blocks may be relatively moved in the one or the other direction, whereas the other screw at the time being ensures the locking of the structure in its new diametrical adjustment. This interrelation of the two screws permits the adjustment of the blocks correctly to a fraction of a millimeter without the employment of special gauges or the like. As Fig. 3 shows, a graduation or scale 14 is arranged on the upper surface of block 3 and around the shank 9 of screw 6, this screw being provided on its upper face with a suitable marking 15 cooperating with the graduation 14. Since a complete turn of the screw 6 corresponds to a certain length of axial movement in the block 4, it is evident, that adjustments correct to fractions of a millimeter can be readily and easily effected.

It may be added, that it is not absolutely necessary that the screw 6 performs its locking effect by a pressure action, that is by pressing outwardly upon the blocks 3 and 4. The same result can manifestly be obtained by the opposite arrangement, that is by a pulling action acting in the opposite direction upon the blocks 3 and 4 as will be described at a later stage of this specification with reference to Fig. 19.

The blocks 3 and 4 carry at their forward ends blades 16 and 17 the undercut ends 18 of which engage with corresponding grooves or recesses of the blocks and are pressed against the walls of the said recesses by means of a key 19 extending substantially in the direction of the cutting edges. This key is of very special importance in connection with drilling tools according to the invention, as it ensures the compact construction already referred to and which is of imperative necessity for this kind of tool. It further permits a safe fixing and an easy disconnection of the blades as well as their displacement within their supporting grooves so that they may be used until completely worn down.

A similar manner of fixing the cutting blades to the blocks is illustrated in Figs. 7 and 8. The difference of this arrangement over that shown in Figs. 1 and 2 consists in that the adjustable blocks are slanted towards the front of the tool as in twist drills, and the cutting edges of the blades 16 and 17 lie askew to each other.

According to Figs. 9 and 10 the cutting edges are secured to the blocks 3 and 4 by means of two keys 19', which in this modification extend substantially normal to the general direction of the cutting edges. Figs. 11 and 12 show a similar arrangement of blade connection, however, in this case an intermediate lining $19^2$ is interposed between the keys 19' and the blades which evenly distributes the pressure of both keys upon the blades.

In the practical use of the new drilling tool and especially in the use of those constructions in which the blades are secured to the front faces of the tool body, considerable strains are set up acting towards a separation of the frontwardly open forked part of the tool body which constitutes the guide for the blocks. In order to enable the tool body to effectively resist these strains without undue deformations or vibration and without it becoming necessary to either make the tool body too weak or too clumsy, provision is made according to the invention for bracing the tool body by a suitable stiffening member adapted to resist stresses and strains in diametrical directions. In the embodiment of Figs. 1–3 the guide walls of the tool body 1 are stiffened by a cap or tie 20 which bridges the free slotted ends of the guide slot of the tool body in such a manner, that the slotted ends are prevented from giving way in any direction without, however, effecting the free movability of the blade carrying blocks. This cap 20 is provided with a circular flange 21 and a bridge or tie piece 22 whose outer edges 23 are concentric to the said flange 21. The latter engages over the correspondingly reduced forward end of the tool body 1 (Fig. 2), and the outer surface of the bridge piece 22 rests against the machined annular inner face of the guiding slot. Screws 24 are provided to secure part 20 to the tool body 1. The part 20 in order to be easily mounted in the aforesaid manner, is manufactured in such a way, that a full blank is first produced from which, for the purpose of forming the flange 21 and the abutment surface 23, the material between these two portions is removed. The cylindrical member obtained in this way is then cut at opposite ends so as to form slots and so as to leave only the bridge piece or web 22 which is shown in Figs. 5 and 6 and which is sufficiently strong to stiffen the free ends of the forked tool body 1. The two blocks 3 and 4 are adapted to move within the slot formed in this way to both sides of the bridge piece 22, so that adjustment of the tool diameter is possible within a great range thereby preserving the compact and yet stable and rigid construction.

The modification shown in Figs. 13 and 17 generally corresponds to the modifications already described. From these it differs in that the tool body is not stiffened by a specially arranged cap, but by the blocks 3 and 4 themselves. These blocks are provided at both their sides with a flange 25 projecting towards the tool body and which engages over the correspondingly shaped face portion of the tool body, so that tensional and compressional stresses adapted to produce a deformation of the tool body will be taken up and counteracted by the blocks. As regards mode of operation and construction this modification corresponds in every respect to the first described modification with the exception of a slight difference in the formation of the blades.

In Figs. 18 to 20 a modification is shown, in which an especially reliable guiding of the blocks 3 and 4 is obtained by the screw 5 being mounted in the center of the cheeks. Whilst in the aforesaid construction the said screw is received with its plain shank portion in a corresponding seat of the tool body it rests in this modification in the bridge portion of the stiffening cap 20. This arrangement is distinguished by its extraordinary rigidity, as the blocks are engaged by the screw nearest to the blades.

In the embodiment shown in Figs. 21 and 22 of the drawings, the cutting edges are not arranged at the front end of the tool as in the construction previously referred to, but they extend approximately parallel to the axis of the tool. Such an arrangement is especially to be recommended when the invention is to be applied to reamers, screw cutting dies and the like. In Fig. 22 four of these axially disposed cutting edges 26 for cutting tapped holes are provided; the arrangement being such, that the four cutting edges constitute the corner points of the diagonals of a rectangle the point of intersection of which is positioned in the central axis of the tool body. This arrangement is also distinguished from others in that the displacement and tightening of the blocks 3 and 4 is effected by three instead of two screws. These are the right and left hand threaded screw 5 which, as in the case of the other modifications, is supported in the bridge piece 22 of the stiffening cap, the compression screw 6 which, in this case, is located in the front end of the blocks and a tension screw 27 which is carried by the other end of the blocks. Obviously the position of the screws 6 and 27 may be reversed, that is to say, the screw 27 may be at the forward end and the screw 6 at the backward end. Again, it is not at all necessary that one of the screws should be acting by tension and the other by compression, as both screws 6 and 27 may act in the same sense either by tension or by compression. It will be evident in any case, that by the arrangement of three screws at the centre and at ends of the blocks and by the arrangement of the stiffening cap with its bridge piece 22 an extraordinary effective stiffening or bracing of the tool is ensured and a very great drilling capacity is rendered possible without incurring the risk of the tool trembling or vibrating under the strain of work and without its easy adjustability being in any way impaired.

Fig. 23 shows the front end of a drilling tool constructed in accordance with any of the aforedescribed modification. In this modification the front ends of the blocks 3 and 4 are provided with a circular dove-tail groove 28 with which the ends of the blades are adapted to engage. The bases of the blades are pressed into this groove by means of horizontally disposed keys 30 and the four cutting edges 31 of the blades 29 are arranged symmetrically to both vertical axes of the blocks 3 and 4 and the horizontal axis of the tool body 1, so that they form the corners of a rectangle which is symmetrical and parallel to both these axes. Moreover the edges are ground off radially and apart from this, they are provided with radially disposed frontal cutting edges 32.

In Figs. 24 and 25 an embodiment of the invention is illustrated, which is especially adapted to be used for boring bars, that is to say, to be applied to horizontal boring plants. Design, guiding and adjustment of the blocks in this case may be the same as in any other of the aforedescribed modifications. However, for the purpose of applying the tool to the spindle 35 the bridge piece 22 is considerably extended and ends with a head 34 into the bore of which the correspondingly reduced end 35 of the bar 33 is received.

In the modification shown in Fig. 26, the tool body 1 consists of two corresponding halves $1^a$ and $1^b$, between which the blocks 3 and 4 are arranged just as in any of the aforedescribed modifications. These halves $1^a$ and $1^b$ of the tool body are held together by sleeves 36 and 37 which are shrunk or screwed on its reduced ends, and the bar 33 is directly screwed into the tool body. The tool body in this modification is as distinguished from the aforedescribed modifications not stiffened by a cap which is provided with a stiffening web or bridge piece, but by means of a riveted brace or tie piece 39 of approximately flat rectangular cross section and which is riveted to the portions $1^a$ and $1^b$ of the tool body.

The modification according to Fig. 27 of the drawings corresponds in its essential details to that shown in Fig. 26, with the exception, that the two halves of the tool body 1 are held together by rivets 41 instead of the rings 36 and 37. Further, the bar 33 is not screwed into the tool body but is screwed over the end which carries the rivet 41 and so as to engage over the rivet heads.

In the construction shown in Figs. 28 to 30 the rivet 41 is exposed and the bar 33 engages with its threaded bore over the threaded extensions which are formed on the two body halves 1ª and 1ᵇ beyond the rivet. Besides, the screw 5 in this example is journalled within the bridge piece 42 which differs from the bridge piece 39 described in connection with Fig. 27 inasmuch as that portion of the said bridge piece which is positioned between the halves 1ª and 1ᵇ is provided with a slot to receive the unthreaded portion of the right and left hand threaded screw 5.

What I claim as my invention is:—

1. A diametrically adjustable drilling tool comprising a tool body, a pair of blades carrying blocks arranged in a diametrical guide constituted by the said tool body and held therein against endwise and lateral displacement, means for diametrically adjusting the said blocks and means carried by one of said blocks and cooperating with the other of said blocks for tightening said blocks in their adjusted positions against said adjusting means, said tightening means acting in the same direction as said adjusting means.

2. A diametrically adjustable drilling tool, comprising a tool body, blade carrying blocks supported by a diametrical guide constituted by the said tool body against endwise and lateral displacement, but arranged for diametrical displacement, a screw for diametrically adjusting the said blocks and a separate screw carried by one of said blocks for tightening the said blocks in their adjusted positions against said adjusting screw.

3. A diametrically adjustable drilling tool, comprising a tool body, constituting a diametrical guide having walls parallel with the tool axis and adapted to guide blade carrying blocks in a diametrical direction, blade carrying blocks arranged in the said guide and held therein against endwise and lateral movement, a screw having its axis parallel with the diametrically guiding walls and passing through the tool axis, the said screw being adapted to adjust the diametrical relation of the blade carrying blocks, and a separate screw parallel with the said adjusting screw and having its axis intersecting the tool axis, the said separate screw cooperating with said blade carrying blocks for tightening them in their diametrically adjusted positions against said adjusting screw.

4. A diametrically adjustable drilling tool, comprising a tool body, blade carrying blocks supported by a diametrical guide constituted by the said tool body against endwise and lateral displacement but arranged for being diametrically displaced, means carried by the tool body for adjusting the blade carrying blocks diametrically, and means carried by one of the blocks and cooperating with the other blade carrying block for tightening both of said blocks in their adjusted positions against said adjusting means.

5. A diametrically adjustable drilling tool, comprising a tool body, a pair of blade carrying blocks supported by a diametrical guide constituted by the said tool body against endwise and lateral displacement, but arranged for being diametrically displaced, means carried by the tool body and engaging with both blade carrying blocks for adjusting them diametrically, and separate means carried by one of the blocks and cooperating with the other blade carrying block for tightening both of said blocks in their adjusted positions against said adjusting means.

6. A diametrically adjustable drilling tool, comprising a tool body, blade carrying blocks supported by the said tool body for diametrical adjustment, an adjusting screw for diametrically adjusting the said blocks and a separate screw for tightening the said blocks in their diametrically adjusted positions against the threads of said adjusting screw and adapted to cooperate with the said adjusting screw for predetermining the range of diametrical adjustment.

7. In a boring tool, the combination of a boring bar having a diametrical slot therein, a pair of blade carrying blocks arranged in said slot for sliding movement towards and away from each other, an adjusting screw for said blocks arranged in the plane thereof and having right-and-left-hand threaded portions in engagement therewith, and a rotatable member parallel to said adjusting screw, said member having a cylindrical portion rotatable and slidable in a bore in one of said blocks, an abutment at one end of said cylindrical portion engaging a wall of said block and a threaded portion engaging in a threaded bore in the other of said blocks.

8. In a boring tool, the combination of a boring bar having a diametrical slot therein, a pair of blade carrying blocks arranged in said slot for sliding movement towards and away from each other, an adjusting screw for said blocks arranged in the plane thereof and having right-and-left-hand threaded portions engaged in correspondingly threaded bores formed partly in said bar and partly in said blocks, and a rotatable member parallel to said adjusting screw, said member having a cylindrical portion rotatable and slidable in a bore in one of said blocks, an abutment at one end of said cylindrical portion engaging a wall of said block and a threaded portion engaging in a threaded bore in the other of said blocks.

9. A diametrically adjustable drilling tool, comprising a tool body having a frontwardly open guiding slot adapted to diametrically guide blade carrying blocks and to support them against endwise and lateral displacement, blade carrying blocks arranged within the said guiding slot, cooperating means for diametrically adjusting the blade carrying blocks and for tightening them in their adjusted positions and a stiffening cap having cylindrical inner and outer surfaces and a central portion arranged between the said blade carrying blocks.

10. A diametrically adjustable drilling tool, comprising a tool body, having a frontwardly open guiding slot adapted to diametrically guide blade carrying blocks and to support them against endwise and lateral displacement, blade carrying blocks arranged within the said guiding slot cooperating means for diametrically adjusting the blade carrying blocks and for tightening them in their adjusted positions and a stiffening cap straddling the frontwardly open end of the guiding slot, having cylindrical surfaces engaging with the faces of the tool body and being recessed symmetrically intermediate the inner faces of the guiding slot, the stiffening cap being adapted to support the guide forming portions of the tool body against diametrical inward or outward deformation.

11. A diametrically adjustable drilling tool, comprising a forked tool body consituting a guide for blade carrying blocks, blade carrying blocks supported in and by the said guide against endwise and lateral displacement, means for diametrically adjusting the said blocks and a separable stiffening member engaging the inner and outer faces of the forked ends of the tool body for stiffening the same.

In testimony whereof I affix my signature in presence of two witnesses.

GEORG SAMUEL.

Witnesses:
MARIE ROHRBACK,
GUSTAV LINTHUS.